July 29, 1924. Re. 15,882
V. SCHLÄFER
PERCUSSION FUSE
Original Filed Sept. 4, 1920
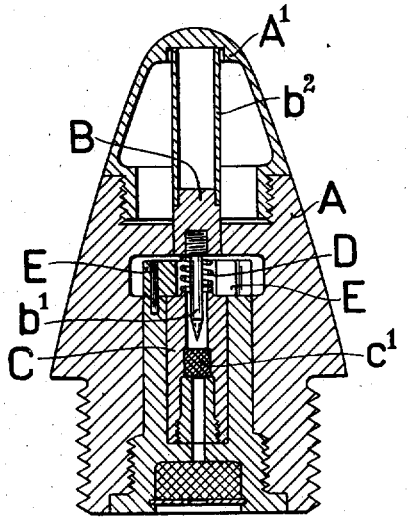
Inventor
Valentin Schläfer
By Knight Bros
Attys Reissued July 29, 1924. Re. 15,882

UNITED STATES PATENT OFFICE.

VALENTIN SCHLÄFER, OF ESSEN, GERMANY, ASSIGNOR TO FRIED. KRUPP AKTIEN-GESELLSCHAFT, OF ESSEN-ON-THE-RUHR, GERMANY.

PERCUSSION FUSE.

Original No. 1,366,499, dated January 25, 1921, Serial No. 408,405, filed September 4, 1920. Application for reissue filed February 9, 1921. Serial No. 443,705.

(GRANTED UNDER THE PROVISIONS OF THE ACT OF MARCH 3, 1921, 41 STAT. L., 1313.)

*To all whom it may concern:*

Be it known that I, VALENTIN SCHLÄFER, a citizen of the German Republic, residing at 28 Einig Keitstrasse, Essen, Germany, have invented certain new and useful Improvements in Percussion Fuses, of which the following is a specification.

This invention relates to a percussion fuse with a rammer, which in addition to high sensitiveness possesses a very simple and at the same time reliable construction for preventing the entrance of dust and moisture.

The invention will be described with reference to the accompanying drawings,

The figure is a longitudinal section of the construction.

I will now particularly describe the structure illustrated in the figure.

A denotes the body of the fuse and B the rammer which is movable longitudinally relatively thereto in an axial direction, and which rammer carries a firing pin $b^1$, which projects into a striker C movable longitudinally also in an axial direction relatively to the body A of the fuse, and which firing pin $b^1$, when the fuse is in the transport state, stands opposite to and a short distance away from a detonator $c^1$ mounted in the striker C. Between the rammer B and the striker C is interposed a weak helical spring D. The fuse is rendered safe in the usual way by means of a number of locking pieces E, which in the transport state of the fuse project into the path of the rammer B and the striker C and during the flight of the projectile swing outwards in a well-known manner one after the other by reason of centrifugal force. The part $b^2$ of the rammer which projects out beyond the body A of the fuse is made in the form of a thin-walled, easily compressible tube and is covered by a likewise compressibly protecting cap $A^1$, which, without being connected to the rammer, is screwed to and so forms part of the body A of the fuse. The rammer B and the protecting cap $A^1$ remain permanently connected to the fuse. The fuse is therefore on the one hand able to be used at once even in the transport state and at the same time always protected against the entrance of dust and moisture. If a projectile provided with the fuse described should fall during transport from a great height with the point first towards the ground, the cap $A^1$ and the tube-shaped part $b^2$ of the rammer will only be compressed together, any perforation of the safety device formed by the locking pieces E not being possible in this case.

When the projectile is fired the locking pieces E prevent in the usual way the rammer B from flying back so far under the action of inertia that the firing pin explodes the detonator $c^1$. After the projectile has been ejected from the barrel of the gun, the locking pieces swing outwards by reason of centrifugal force and release the rammer and the striker. The firing pin $b^1$ is now only kept from contacting with the detonator $c^1$ by the comparatively weak spring D. As the rammer B is completely protected against the action of the air pressure by the cap $A^1$, the weak action of the spring D is enough absolutely in order to prevent any premature explosion of the detonator. It is therefore not necessary, in contradistinction to other known fuses in which the rammer is exposed to the action of the air pressure, to provide special measures for securing the rammer against a premature movement by the air pressure, whereby very considerable simplification of the construction of the fuse is attained. When the projectile strikes and if it strikes on the point the cap $A^1$ is stove in and so drives the rammer inwards, so that the firing pin $b^1$ explodes the detonator $c^1$. As the resistance of the cap $A^1$ may be made as small as may be desired, a corresponding sensitiveness of the fuse can be secured without difficulty. If the impact of the projectile is so flat that the cap $A^1$ is not stove in, the ignition is effected by the striker $c$ shooting forwards and driving the detonator on to the firing pin $b^1$. As the striker has only to overcome the resistance of the weak spring D the fuse possesses a high degree of sensitiveness in this case also.

Claims:

1. A percussion fuse of the class described, comprising a body, a striker, a rammer formed with a main section and an easily compressible section, the main portion of the rammer being contained within the body, a comparatively weak spring interposed between the rammer and the striker, and a comparatively fragile protecting cap permanently attached to the body of the fuse, the compressible section of said rammer contacting with the cap.

2. A percussion fuse of the type described, which comprises a body, a striker, a rammer formed with a main section and a compressible extension, a firing pin carried by the main section of the rammer, said striker, rammer and firing pin being in axial alinement, a comparatively weak spring disposed between said rammer and said striker, the main portion of said rammer being contained within the body, and a compressible projecting cap permanently connected to the body of the fuse, the compressible part of said rammer contacting with said cap.

3. A fuse for projectiles comprising a body, a rammer, two firing parts, one of which is carried by the rammer, a compressible cap rigidly attached to said body and permanently covering said rammer, and a safety device having locking means normally extending between said firing parts for preventing accidental firing movement of the rammer and adapted to automatically release the rammer after firing; the rammer, when released from said locking means, being so easily movable in the direction of firing, that it remains in position during flight only when covered by said compressible cap against air pressure.

4. A fuse for projectiles comprising a body, a rammer having a comparatively fragile part projecting beyond said body, two firing parts, one of which is carried by the rammer, a compressible cap rigidly attached to said body and permanently covering said rammer, and a safety device having locking means normally extending between said firing parts for preventing accidental firing movement of the rammer and adapted to automatically release the rammer after firing; the rammer, when released from said locking means, being so easily movable in the direction of firing, that it remains in position during flight only when covered by said compressible cap against air pressure.

5. A fuse for projectiles comprising a body, a rammer, two firing parts, one of which is carried by the rammer, a compressible cap rigidly attached to said body and permanently covering said rammer, the rammer being movable independently of said cap, a weak spring interposed between said firing parts and tending to separate them, and a safety device interposed between said firing parts for preventing accidental firing movement of the rammer; the rammer, after said safety device has been thrown out of action being so easily movable in the direction of firing that it remains in position during flight only when covered by said compressible cap against air pressure.

VALENTIN SCHLÄFER.